United States Patent
Kihara

(10) Patent No.: US 9,052,245 B2
(45) Date of Patent: Jun. 9, 2015

(54) DIFFERENTIAL PRESSURE/PRESSURE TRANSMITTING DEVICE

(71) Applicant: Azbil Corporation, Tokyo (JP)

(72) Inventor: Keisuke Kihara, Tokyo (JP)

(73) Assignee: Azbil Corporation, Tokyo (JP)

( * ) Notice: Subject to any disclaimer, the term of this patent is extended or adjusted under 35 U.S.C. 154(b) by 111 days.

(21) Appl. No.: 13/930,349

(22) Filed: Jun. 28, 2013

(65) Prior Publication Data

US 2014/0020472 A1    Jan. 23, 2014

(30) Foreign Application Priority Data

Jul. 19, 2012    (JP) .................................. 2012-160542

(51) Int. Cl.
*G01L 15/00*    (2006.01)
*G01L 7/08*    (2006.01)
*G01L 13/02*    (2006.01)
*G01L 19/06*    (2006.01)
*G01F 1/36*    (2006.01)

(52) U.S. Cl.
CPC ................. *G01L 7/08* (2013.01); *G01L 13/026* (2013.01); *G01L 19/0672* (2013.01); *G01F 1/363* (2013.01)

(58) Field of Classification Search
CPC .............................................. G01L 7/00–7/24
See application file for complete search history.

(56) References Cited

U.S. PATENT DOCUMENTS

| 4,054,059 A * | 10/1977 | Kay ................................. 73/716 |
| 4,971,523 A * | 11/1990 | Wacker et al. .................. 417/63 |
| 7,117,745 B2 | 10/2006 | Broden |
| 2005/0115402 A1* | 6/2005 | Hembree .......................... 92/96 |
| 2005/0172738 A1 | 8/2005 | Broden |

FOREIGN PATENT DOCUMENTS

| CN | 1654938 | 8/2005 |
| CN | 2833526 | 11/2006 |
| CN | 101097166 | 1/2008 |
| JP | H05-288620 | 11/1993 |
| JP | H09-189634 A | 7/1997 |
| JP | 2001-295925 | 10/2001 |
| JP | 2002-156301 A | 5/2002 |

OTHER PUBLICATIONS

Chinese Office Action dated Feb. 2, 2015, which issued during prosecution of Chinese Application No. 201310264398.5, which corresponds to the present application.

* cited by examiner

*Primary Examiner* — Andre Allen
(74) *Attorney, Agent, or Firm* — Troutman Sanders LLP

(57) ABSTRACT

A differential pressure and pressure transmitting device includes a pressure detecting portion and a rupture state detecting portion. The pressure detecting portion includes a first diaphragm that receives indirectly a pressure of a process fluid and that transmits a pressure, a second diaphragm that receives directly a pressure of a process fluid, and an insulating fluid-filled portion positioned between the first and second diaphragms and filled with an insulating fluid, and provided with a pair of electrodes on a periphery thereof. The rupture state detecting portion applies an electropotential to the electrodes to measure the electrical conductivity of the insulating fluid and to monitor for a rupture of a diaphragm.

2 Claims, 3 Drawing Sheets

DIFFERENTIAL PRESSURE/PRESSURE TRANSMITTING DEVICE

CROSS REFERENCE TO RELATED APPLICATION

This application claims priority to Japanese Patent Application No. 2012-160542, filed on Jul. 19, 2012, the entire content of which being hereby incorporated herein by reference.

FIELD OF TECHNOLOGY

The present invention relates to a differential pressure/pressure transmitting device, and relates to a diaphragm mechanism of a pressure detecting portion that is attached to piping, or the like, in which a (process) fluid to be measured is flowing.

BACKGROUND

In differential pressure/pressure transmitting devices that are used for measuring flow rates, pressures, fluid levels, specific gravities, and the like, of process fluids in oil, petrochemical, and chemical plants, and the like, if the process fluid is a high-temperature, high-viscosity, corrosive, or coagulable fluid, a so-called remote sealed differential pressure/pressure transmitting device is used, wherein a pressure cell, for forming a pressure detecting portion, and a transmitting device main unit are connected together by a capillary tube that is filled with a filling fluid in order to transmit the pressure, where the pressure of the process fluid is received by a fluid-contacting diaphragm of the pressure cell and the dislocation of the fluid-contacting diaphragm is transmitted to the transmitting device main unit through the filling fluid. When a remote sealed differential pressure/pressure transmitting device is used, a flange is attached to the tank or pipe that will be subjected to measurement, and the pressure cell is interposed between this flange and an attachment flange, where the attachment flange is secured to the flange through a plurality of attachment bolts. See, for example, Japanese Unexamined Patent Application Publication H9-189634 ("JP '634").

As illustrated in the JP '634, in a remote sealed differential pressure transmitting device that is made from such a structure, when the process fluid low-pressure side and high-pressure side pressures are applied to the fluid-contacting diaphragms of respective pressure cells, the fluid-contacting diaphragms dislocate and these dislocations are transmitted through the filling fluids to the transmitting device main unit, where the differential pressure at this time is converted into an electric signal by a semiconductor pressure sensor and subjected to calculation processing, making it possible to measure the flow rate of a process fluid. Note that while the explanation set forth above is for a differential pressure transmitting device, the exact same thing can be said for a pressure transmitting device as well. Consequently, in the present invention, the general term for both transmitting devices will be "differential pressure/pressure transmitting device."

Japanese Unexamined Patent Application Publication 2002-156301 ("JP '301") proposes an invention with a diaphragm structure wherein the diaphragm has a double-layer structure where diaphragms are layered together and electric circuits are formed on both diaphragms in order to detect quickly, through a detected electric current, a rupture of a diaphragm, because there have been cases wherein such fluid-contacting diaphragms have become corroded or swollen by the process fluid to then rupture.

Given this, this is a differential pressure/pressure transmitting device having a pressure transmitting portion able to transmit a pressure from a process through a diaphragm to a pressure transmitting fluid, and pressure detecting means for detecting pressure from the process by converting the pressure of the transmitting fluid into an electric signal, wherein the pressure transmitting portion is structured from process pressure detecting means wherein a process-side diaphragm that faces the process side and a fluid-contacting-side diaphragm that faces the pressure transmitting fluid are disposed facing each other in a state of contact, and wherein electrical contact points are provided at locations that face each other, and diaphragm rupture detecting means for detecting the state of contact of the electrical contact points of the process-side diaphragm and the fluid-contacting-side diaphragm.

Given this, in the invention of the JP '301, the two layers of diaphragms are layered together, and respective electrodes are provided in the centers thereof and caused to face each other. While normally the contact points thereof are in contact, if there is a rupture, or the like, then the contact points become separated, and the open circuit is detected, and thus the electrodes require delicate design and manufacturing in order to be mounted on the diaphragm, which is a thin plate.

However, the diaphragm is normally several dozen micrometers thick, making it difficult to provide an electrode, or the like, thereon. When an electrode is provided on the diaphragm, the stresses thereof will act on the diaphragm, having a negative effect on the actual pressure detecting characteristics of the diaphragm. On the other hand, if the electrodes are too thin, then there will be the risk of an electrode becoming broken through the operation of the diaphragm.

Given this, the problem in the present invention is to detect a rupture of a diaphragm without provision of electrodes on the diaphragms.

SUMMARY

The present invention is a differential pressure/pressure transmitting device includes a pressure detecting portion provided with a first diaphragm, a second diaphragm, and an insulating fluid-filled portion, located therebetween, filled with an insulating fluid and provided with a pair of electrodes on a periphery thereof, and a rupture state detecting portion that applies an electropotential to the electrodes to measure the electrical conductivity of the insulating fluid, to monitor for a rupture of a diaphragm.

Moreover, in the present invention, as a subsidiary concept, a silicone oil or fluorine oil is filled as the insulating fluid.

In this way, the present invention makes it possible to detect electrically a case wherein the second diaphragm, which directly faces the process fluid, has ruptured, doing so through electrodes that read, in an insulating fluid, a change in the electrical conductivity of the insulating fluid.

Moreover, even if not to the point of a rupture, there will still be a change in the electrical conductivity of the insulating fluid even when there is swelling due to hydrogen permeation, enabling similar detection.

Furthermore, a structure such as in the present invention also has the effect of enabling reuse of the transmitting device by merely swapping the diaphragm portion if the second diaphragm becomes deformed.

BRIEF DESCRIPTIONS OF THE DRAWINGS

DETAILED DESCRIPTION

Figure 1:
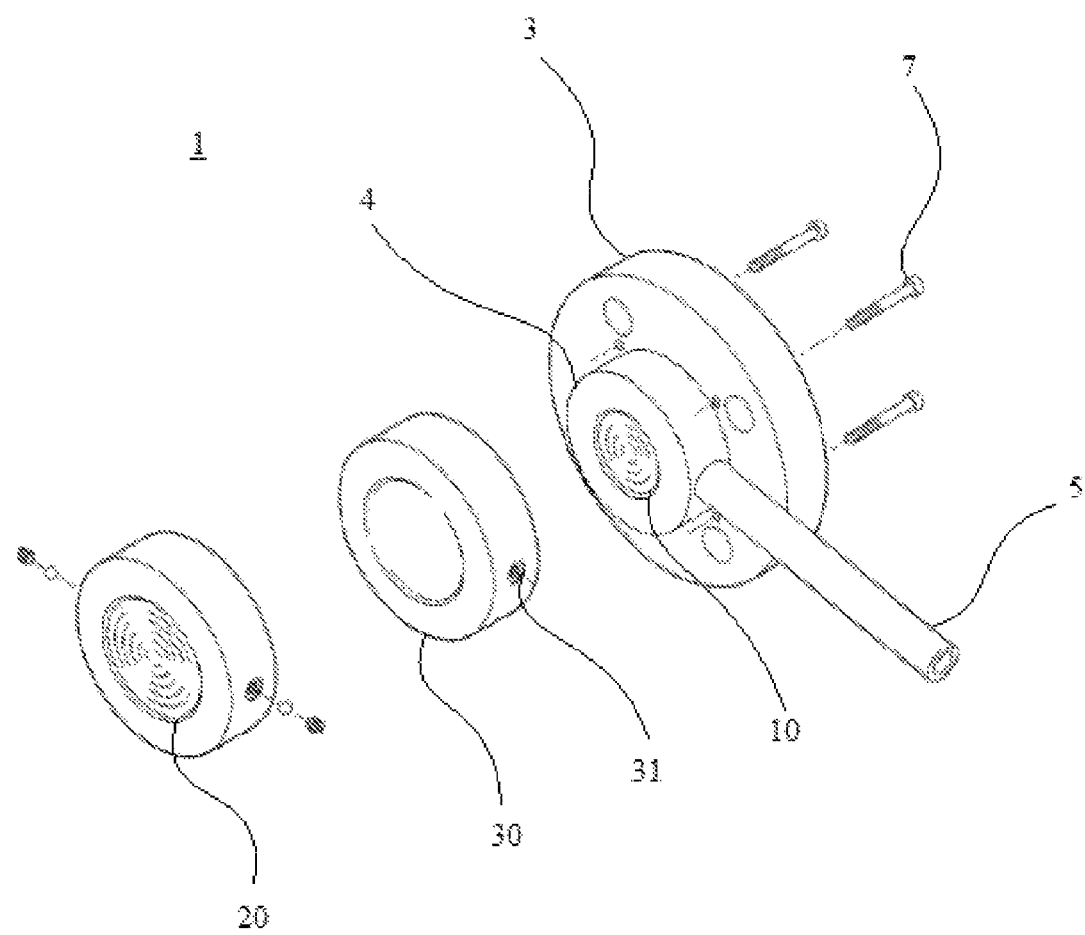
FIG. 1 is a perspective diagram of a pressure detecting portion in a differential pressure/pressure transmitting device according to the present invention.

A schematic of a pressure detecting portion according to an example of the present invention is illustrated in FIG. 1. While various structural elements in the present invention will be explained, other structural elements are identical to those in the prior art, and thus explanations are omitted as appropriate.

First, 1 refers to the entirety of the pressure detecting portion. 3 therein is a pressure cell. The pressure cell 3 is provided with a body 4 having a first diaphragm 10 provided on one side face thereof. The first diaphragm 10 is secured through welding to the body 4. The outer peripheral surface of the body 4 assumes a shape having a plurality of holes for attaching bolts 7.

Additionally, the pressure that is received by a back side chamber of the first diaphragm 10 is coupled to a pressure transmitting device main unit (not shown) through a pressure transmitting filling fluid that is filled into a capillary tube 5. The filling fluid is silicone oil, or the like.

Another diaphragm, that is, a second diaphragm 20, faces the process fluid. Of course, it is a disk-shaped diaphragm, and receives the pressure of the process fluid that is being measured. Significantly, the first diaphragm can be termed a base diaphragm, and the second diaphragm can be termed an add-on diaphragm.

Moreover, 30 is a portion that is filled with an insulating fluid, and is the critical portion of the present invention for detecting the state of the fluid that conveys the pressure between the first and second diaphragms. This filled portion 30 is a hollow metal part that assumes a ring shape corresponding to the shapes of the first and second diaphragms. When manufacturing the pressure detecting portion (after the provision of electrodes 31), this is interposed between the first diaphragm 10 and the second diaphragm 20 of the pressure cell 3 and secured through welding, after which the insulating fluid is filled therein. Because the hollow interior is filled with this fluid, the pressure that is received by the second diaphragm 20 is transmitted through the insulating fluid to the first diaphragm 10.

At least one pair of electrodes 31 is provided on the metal portion (the periphery of the hollow ring) in the filled portion 30.

The electrodes 31 are of an electrically conductive material, and may be metal, carbon, or the like. The electrodes 31 are secured through being pressed into electrode attaching holes that are provided as appropriate in the metal portion. The outer peripheral edge portions of the attaching holes are lined with an insulating material such as, for example, rubber, Teflon, fluorine resin, or the like. Insofar as it insulates from the metal portion, it may be of any shape. While the shape may be one that passes through from the interior of the metal portion, a seal made from an insulating material would be required. Of course, the distal end of the electrode 31 must be in contact with the insulating fluid.

Note that the electrodes are not limited to one pair, but rather a plurality of pairs of electrodes may be provided.

Figure 2:
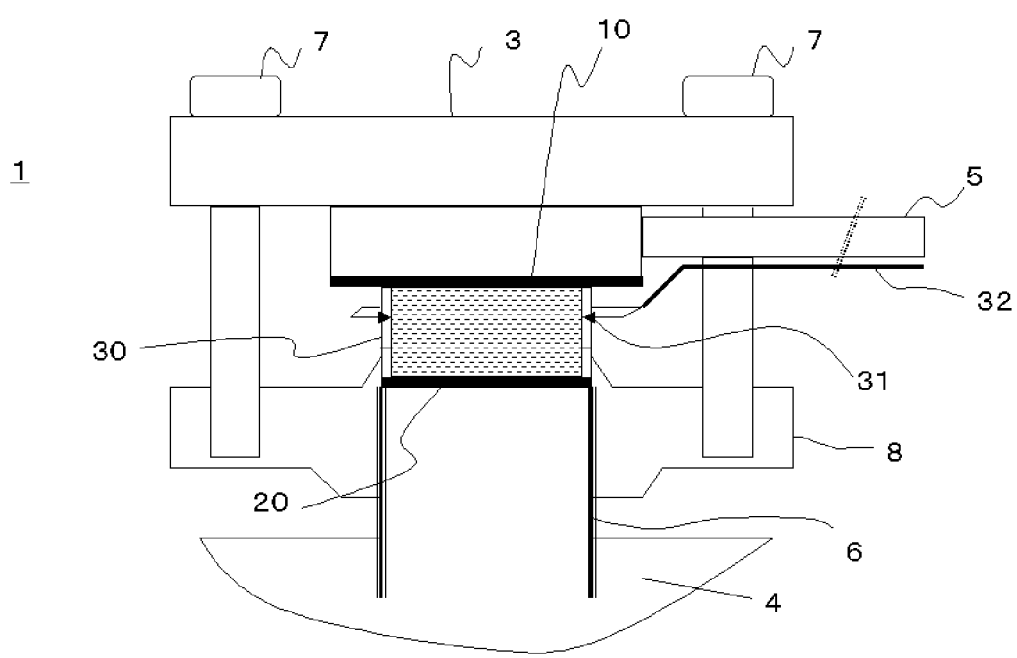
FIG. 2 is a cross-sectional diagram of the pressure detecting portion in a differential pressure/pressure transmitting device according to the present invention (when attached to a pipe).

A cross-sectional diagram of the state wherein the pressure detecting portion 1 is actually installed on a pipe 4 is given next in FIG. 2.

4 is a pipe, and a process fluid flows therein. A flange 8 is secured integrally, by attaching bolts 7, to the pressure cell 3, which is provided with the second diaphragm 20, the insulating fluid-filled portion 30, and the first diaphragm 10, so that the pressure detecting portion 1 according to the present invention is connected to the flange 8 through a nozzle 6. Lead wires 32 connect from the electrodes 31 to the pressure transmitting device main unit portion.

Figure 3:
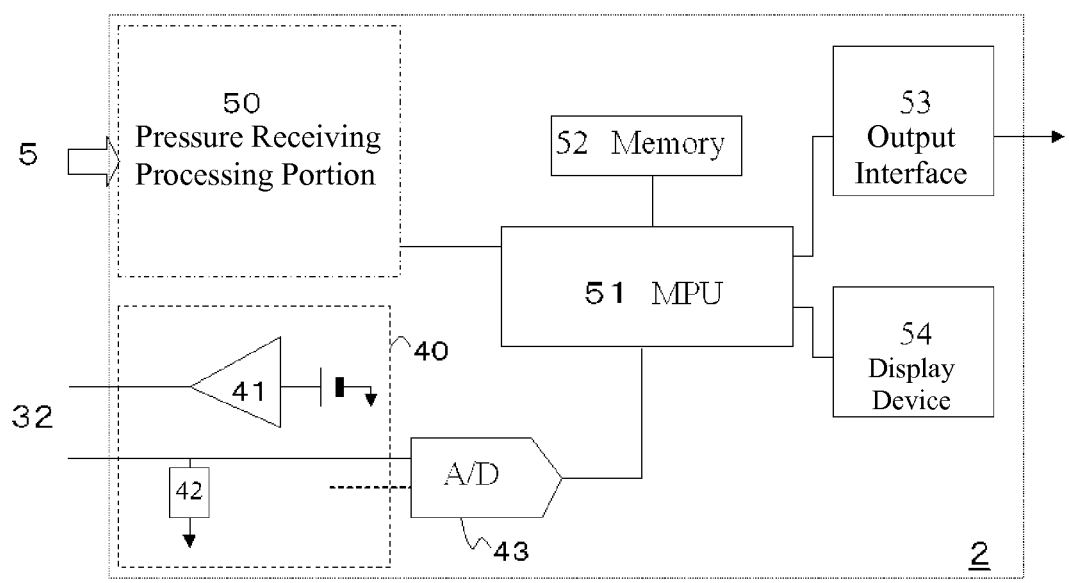
FIG. 3 is a calculating portion of a pressure transmitting main unit in a differential pressure/pressure transmitting device according to the present invention.

The structure of the present invention will be described next from the electrical perspective, referencing FIG. 3.

First, 2 indicates a calculating portion of the transmitting device main unit. This is a device for converting the pressure to an electrical signal.

An MPU 51, a memory 52, an output interface 53, a displaying device 54, and the like, of the normal structure are no different from those that are well-known. The output interface 53 may use DC 4-20 mA, HART communication, or wireless communication, or the like, to transmit and output the pressure value that is measured. The measurement value is the pressure value (PV) of the process fluid, and is processed by a pressure receiving processing portion 50 so as to convert the pressure propagated from the capillary tube 5 into an electric signal by a piezo effect element.

A rupture state detecting portion 40 of the second diaphragm 20 will be explained. Specific electropotentials are applied to the electrodes 31 through the electrode leads 32 from an amp 41. The insulating fluid is silicone oil, fluorine oil, or the like, and normally the resistance value thereof is infinitely large, so the return electric current is substantially 0.

The return electric current flows into a specific impedance element 42, and the voltage produced therein is converted into a digital value by an A/D converting device 43, and monitored by the MPU 51. This is either performed constantly or may be performed at appropriate intervals.

If there is a rupture, or the like, in the second diaphragm 20, then the process fluid and the insulating fluid will mix within the insulating fluid-filled portion 30. The result is an increase in the electrical conductivity of the fluid. This is because a corrosive process fluid has an ionic component.

The MPU 51 sees this value, and if above a specific threshold value, or if a rate of change such as in a rising trend is satisfied, this is detected as the diaphragm 20 having been ruptured.

In this case, either there is a transmission to a higher-level system (not shown) through the output interface 53, or there is a warning display to this effect on the display device 54, and the process administrator becomes aware thereof, to replace the diaphragm.

The circuit structure of the rupture state detecting portion 20 may be structured from a no-resistance electric current meter instead of that which was described above.

Note that a Zener barrier or an electric current limiting resistance, or the like, may be added, to enable the design of an intrinsically safe explosion-proof construction.

Moreover, while for the calculating portion 2 the description is focused on a remote sealed type that is separate from the pressure detecting portion 1, examples of the present invention are not limited thereto. It should be understood that the type may be one wherein the transmitting device main unit is near to the pressure detecting portion, rather than remote, where the lengths of the capillary tube 5, and the electrode leads 32, and the like, may be shortened as appropriate.

Further, numerous modifications and variations of the present invention are possible in light of the above teachings.

It is therefore to be understood that within the scope of the appended claims, the invention may be practiced otherwise than as specifically described herein.

The invention claimed is:

1. A differential pressure and pressure transmitting device, comprising:
    a pressure detecting portion including
        a first diaphragm that receives indirectly a pressure of a process fluid and that transmits a pressure,
        a second diaphragm that receives directly a pressure of a process fluid, and
        an insulating fluid-filled portion positioned between the first and second diaphragms and filled with an insulating fluid, and provided with a pair of electrodes on a periphery thereof; and
    a rupture state detecting portion that applies an electropotential to the electrodes to measure the electrical conductivity of the insulating fluid and to monitor for a rupture of a diaphragm.

2. A differential pressure and pressure transmitting device as set forth in claim 1, wherein:
    the insulating fluid is silicone oil or fluorine oil.

* * * * *